No. 895,980. PATENTED AUG. 11, 1908.
M. DERIHON.
MACHINE FOR TESTING THE WEAR OF METALS.
APPLICATION FILED MAR. 9, 1907.
2 SHEETS—SHEET 1.
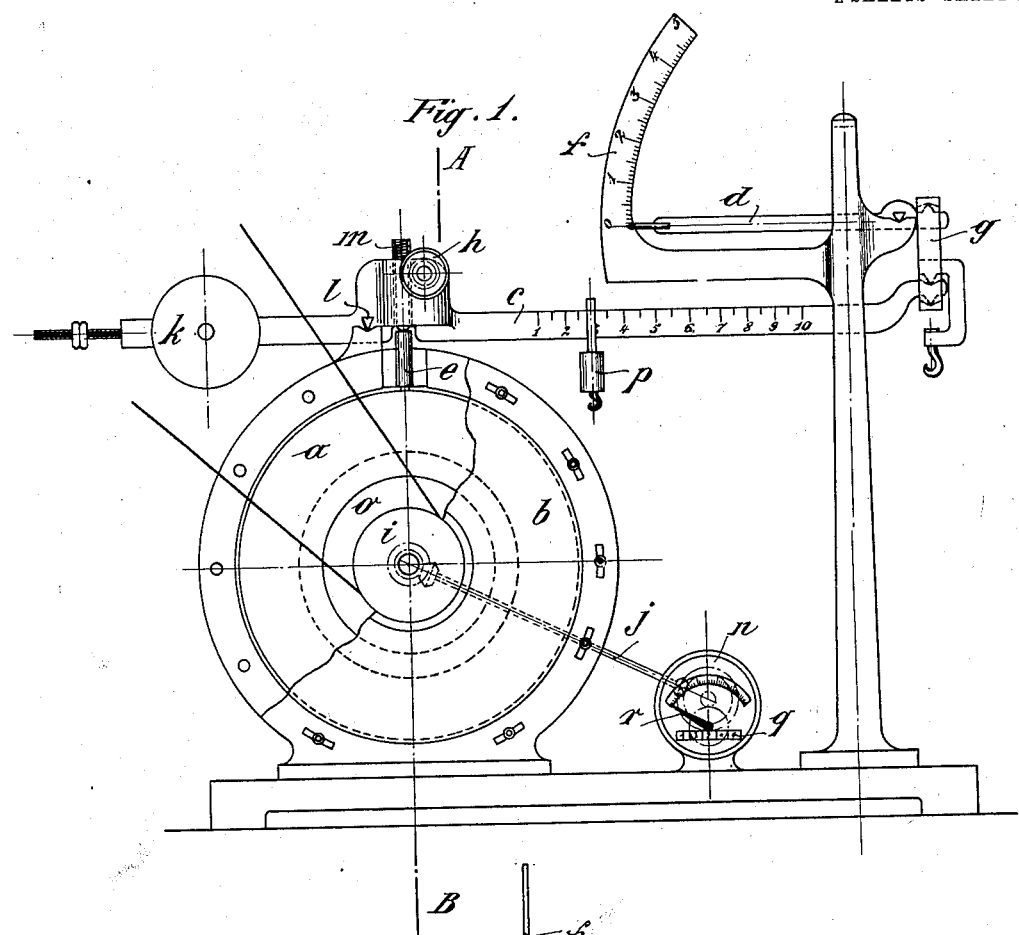
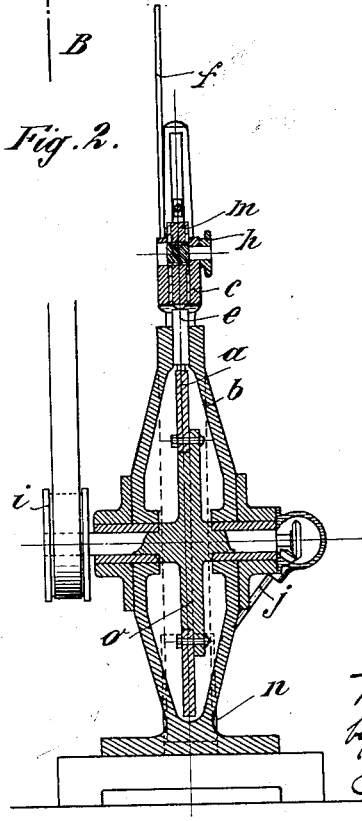

No. 895,980. PATENTED AUG. 11, 1908.
M. DERIHON.
MACHINE FOR TESTING THE WEAR OF METALS.
APPLICATION FILED MAR. 9, 1907.
2 SHEETS—SHEET 2.

UNITED STATES PATENT OFFICE.

MARTIN DERIHON, OF LONCIN, NEAR LIEGE, BELGIUM.

MACHINE FOR TESTING THE WEAR OF METALS.

No. 895,980.     Specification of Letters Patent.     Patented Aug. 11, 1908.

Application filed March 9, 1907. Serial No. 361,532.

*To all whom it may concern:*

Be it known that I, MARTIN DERIHON, subject of the King of Belgium, residing at Loncin, near Liege, Belgium, have invented certain new and useful Improvements in Machines for Testing the Wear of Metals; and I do hereby declare the following to be a full, clear, and exact description of the invention, such as will enable others skilled in the art to which it appertains to make and use the same.

Figure 3:
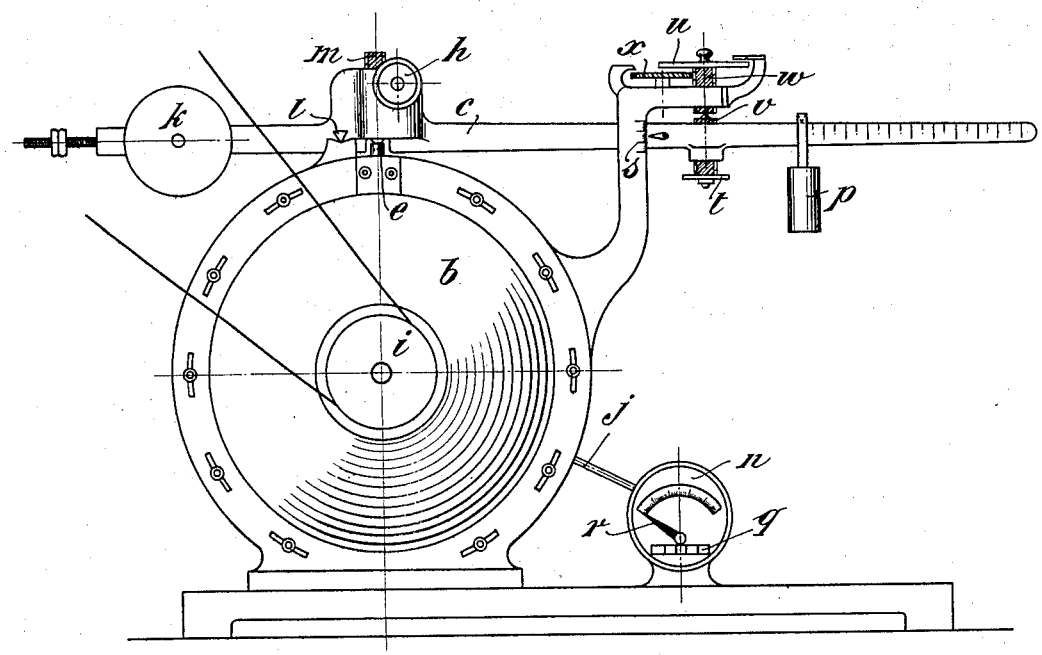
Figure 4:
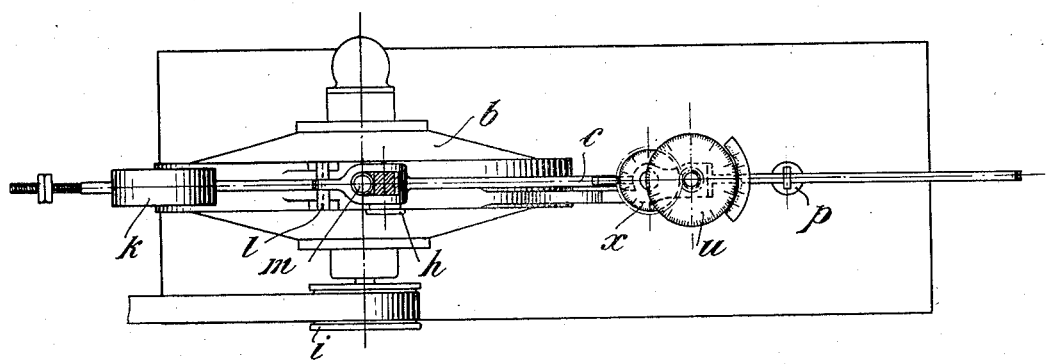

The present invention relates to a direct reading machine for testing metals by wear, and is hereafter described with reference to the accompanying drawings, in which:

Figure 1 is a front view of the machine, in part section. Fig. 2 is a cross section upon line A—B. Fig. 3 is a front elevation of a modification of the preceding arrangement. Fig. 4 is a plan view thereof.

The machine consists of a disk $a$ revolving within a casing $b$ at a pre-determined speed variable at will.

The test-piece or sample $e$ of the metal to be tested, placed vertically upon the periphery of the disk $a$ and guided vertically in the casing $b$, is loaded with a weight $p$ by means of a lever $c$ which rests upon it through a micrometer screw $m$ and this in addition bears on the casing $b$ which supports its fulcrum knife-edges $l$. There is thus obtained between the test-piece $e$ and the disk $a$ a friction proportional to the load given and causing the wear that it is required to ascertain. To determine it directly, the free extremity of the lever $c$ rests in a link $g$ which transmits its movements to a multiplying lever $d$, ending in a needle capable of traveling along a graduated sector $f$. The amplitude of this travel thus corresponds to the decrease of length of the test-piece $e$, that is to its wear. This being so, in order to determine the progressive wear of the test-piece $e$, one proceeds as follows: The test-piece $e$ calibrated to a known section is placed on the disk $a$ and the pressure exerted by the weight $p$ is transmitted to it through the micrometer screw $m$. By means of this screw, one can as shown in the figure, raise or lower the lever $c$, by turning the head of the regulating screw, $h$, so as to place it perfectly horizontal. This position is attained when the needle $d$ is at the zero of the graduations on the sector $f$. In those conditions, supposing that the weight $p$ is exactly at the zero of its scale, the levers $c$ $d$ and the link $g$ loaded with the counterweight $k$, are in equilibrium, so that the load upon the test-piece is *nil*. The latter can then be loaded up to 1, 2, 3 . . . of its scale. The disk $a$ is then set in rotation by a pulley $i$ fixed upon its spindle, or by any other suitable arrangement. This disk $a$ turning in the oil contained in the casing $b$, constantly lubricates the rubbing portion of the testing-piece and thus insures its wear not by seizing or heating, but really by friction.

A revolution counter or speed indicator $n$ gives at each instant the number of revolutions per minute at which the disk is turning. In the example illustrated, this counter $n$ is driven by the spindle of the disk $a$ through the intermediate rod $j$. The instantaneous speed of the disk $a$ is indicated by the needle $r$ upon its dial, while the number of revolutions accomplished since the beginning of the experiment is given by the indicator $q$.

In order to allow the easy replacing of the disk $a$ in case it should become worn, this disk is formed of an annular plate fixed upon the hub $o$ by means of bolts or in any other convenient manner. One thus possesses all the elements required to examine the test-piece: 1.—The load or pressure on unit surface, indicated by the reading of the scale along which the weight $p$ can be moved. 2.—The wear of the test-piece, by direct reading upon the sector $f$. 3.—The speed of rubbing. 4.—The number of revolutions performed by the disk.

When it is required to compare one metal with another, one can maintain constant two or three of these four data; for example, the number of revolutions, the load and the speed, and read upon the graduation $f$ the difference of wear. One can also keep constant the load, the speed and the wear and ascertain the difference by the readings of the number of revolutions. By regulating the load, one can experiment just as well upon very soft and rapidly wearing metals as upon very hard ones considered as subject to or giving no appreciable wear. The progressive wear of the test-piece $e$ can also be determined in a more precise manner by means of the arrangement represented in Figs. 3 and 4, in which the reading of the wear is effected by means of a micrometer screw, that is to say by verniers. The test-piece $e$ receives its load, as in the foregoing example, through the medium of the micrometer screw $m$ and of the lever $c$ which carries the weight $p$ balanced by the counterweight k. This lever c is similarly restored to its horizontal position by means of screws h and m, the position being obtained by the reading of zero upon the fixed scale s along which travels a pointer carried by the lever c. This lever c likewise carries a screw t of which the extremity v can come in contact with the extremity w of a micrometer screw u carried upon the fixed framing or the casing b and gearing in a fixed proportion with a second disk x. For the determination of the extent of wear, I then proceed in the following manner: The micrometer screw u, which gears for example with the disk x in the ratio of 1 to 10, is returned to zero at the same time as the latter. In these conditions, it is necessary for the extremity w of the screw u to be some short distance from the end v of the screw t. These two ends v and u are then brought into contact, by turning the micrometer screw t; one is then exactly at the zero of the scales and the experiment can commence.

During the course of the trial, the scale s indicates, in a ratio of 1 to 10, the wear of the metal of the test-piece e, while the two disks x and u allow the wear of the test-piece to be read in a ratio of 1 to 100 for u and of 1 to 1000 for x, by maintaining the two points v and w in contact and turning the micrometer screw u.

Thus this arrangement, in the above supposition, allows direct and simultaneous reading of the wear of the test-piece of the tenth, the hundredth and the thousandth of a millimeter and affords at each instant a very great exactitude, while allowing the examination of metals deemed indestructible. I may of course vary the proportions of the levers, and the verniers can be other than those above given by way of example, and the apparatus might undergo alterations from a constructional point of view from that now described and illustrated.

No claim is herein made to the specific construction of apparatus illustrated in Figs. 3 and 4 as the same forms the subject-matter of a divisional application.

Having now particularly described and ascertained the nature of my said invention and in what manner the same is to be performed, I declare that what I claim is:

1. In a machine for testing the abrasive resistance of metals, the combination of a revoluble abrading disk, a casing surrounding the disk and having an opening in its top, a lever fulcrumed on the casing and having means for supporting a sample of metal to be tested in the opening in the casing and maintaining the sample in contact with the periphery of the disk, means for rocking the lever to maintain the sample in contact with the disk as the lower surface of the sample is worn away, and means for indicating the extent of such movement of the lever.

2. In a machine for testing the abrasive resistance of metals, the combination of a revoluble abrading disk, a casing surrounding the disk and having an opening in its top, a lever fulcrumed on the casing and having means for supporting a sample of metal to be tested in the opening in the casing and maintaining the sample in contact with the periphery of the disk, an adjustable weight on the lever adapted to maintain the sample in contact with the periphery of the disk, and means for indicating the extent of movement of the lever caused by the weight rocking the lever as the sample is reduced by the action of the disk.

In testimony whereof I have signed my name to this specification in the presence of two subscribing witnesses.

MARTIN DERIHON.

Witnesses:
A. PENDLETON CRUGER,
JOS. BOUTAEL.